United States Patent [19]

Ito

[11] 4,408,235
[45] Oct. 4, 1983

[54] RECORDING MODE LOCKING SYSTEM IN A VIDEO SIGNAL MAGNETIC RECORDING APPARATUS

[75] Inventor: Yukio Ito, Yokohama, Japan

[73] Assignee: Victor Company of Japan, Ltd., Yokohama, Japan

[21] Appl. No.: 269,886

[22] Filed: Jun. 3, 1981

[30] Foreign Application Priority Data

Jun. 4, 1980 [JP] Japan .................................. 55/75313

[51] Int. Cl.³ .......................... G11B 15/18; G11B 5/52
[52] U.S. Cl. ....................................... 360/71; 360/85; 360/95
[58] Field of Search ......................... 360/71, 85, 95, 61

[56] References Cited

U.S. PATENT DOCUMENTS 4,075,670  2/1978  Namoto et al. ......................... 360/85

FOREIGN PATENT DOCUMENTS 2158275 11/1970 Fed. Rep. of Germany ........ 360/71
2216896  4/1971 Fed. Rep. of Germany ........ 360/71
2220031  6/1971 Fed. Rep. of Germany ........ 360/71

Primary Examiner—Vincent P. Canney
Attorney, Agent, or Firm—Louis Bernat

[57] ABSTRACT

In a video signal magnetic recording apparatus having a loading mechanism for loading a magnetic tape which is placed at a predetermined position unto a predetermined tape path and unloading a magnetic tape which is in a loaded state, a power source switch for supplying or interrupting the supply of power by closing or opening, and a mechanism for enabling the loading mechanism to perform an unloading operation when the power source switch is closed, a recording mode locking system comprises a locking switch circuit which is closed for locking the recording mode, and a recording mode signal producing circuit for producing a recording mode signal upon closing of the power source switch in a state where the locking switch circuit is in a closed state. The loading mechanism is supplied with the recording mode signal when the power source switch is opened and then closed afterwards during a loading state, to remain in the loading state.

4 Claims, 8 Drawing Figures

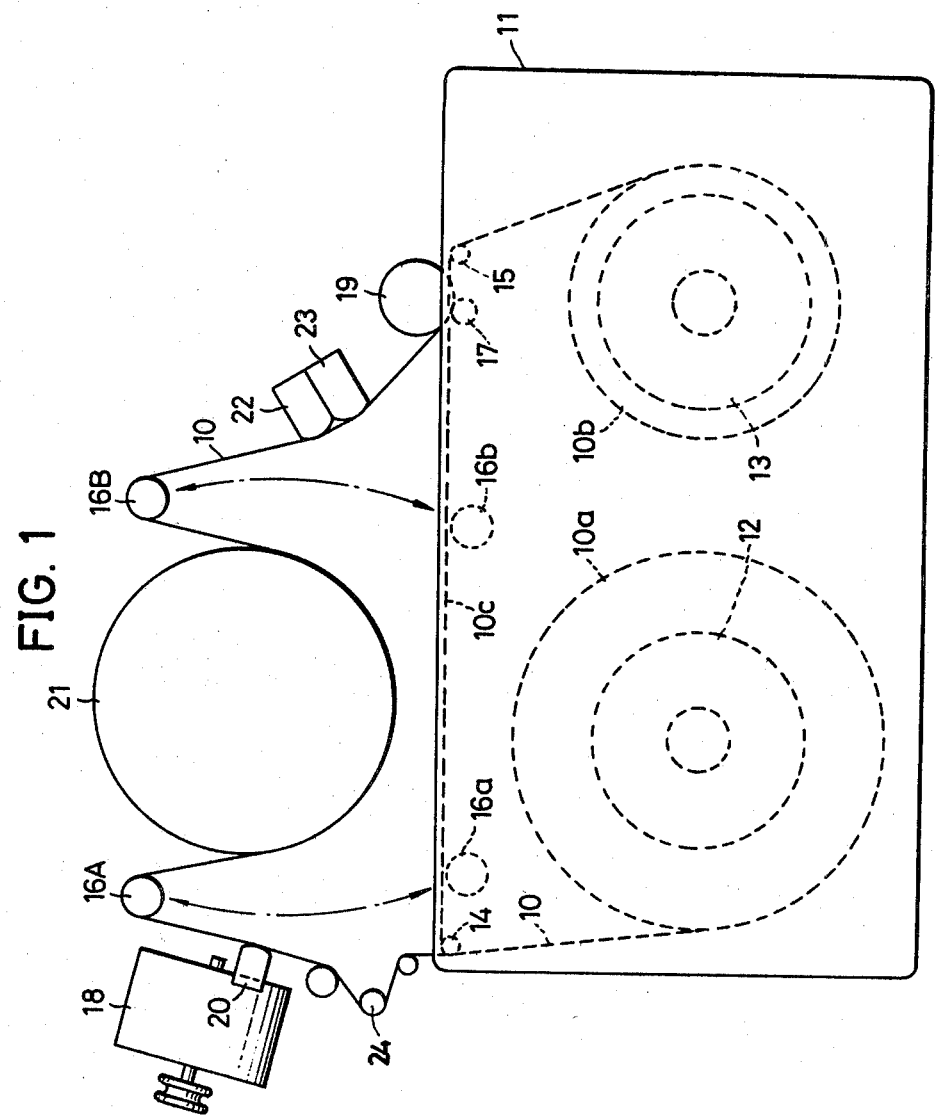

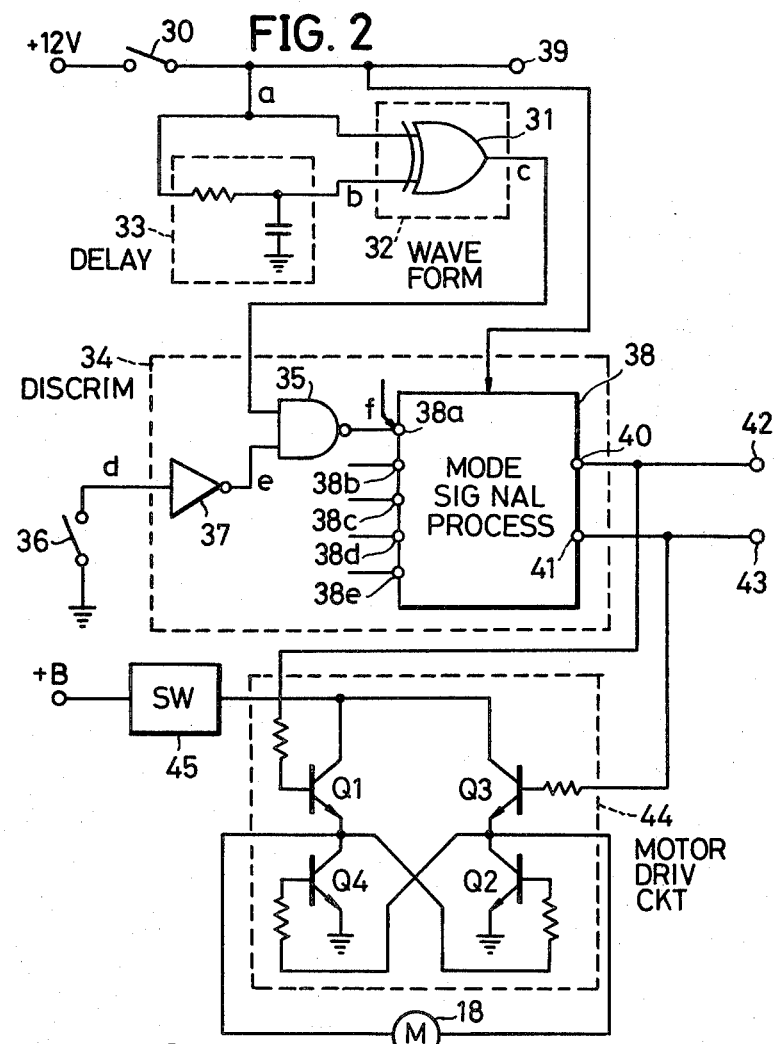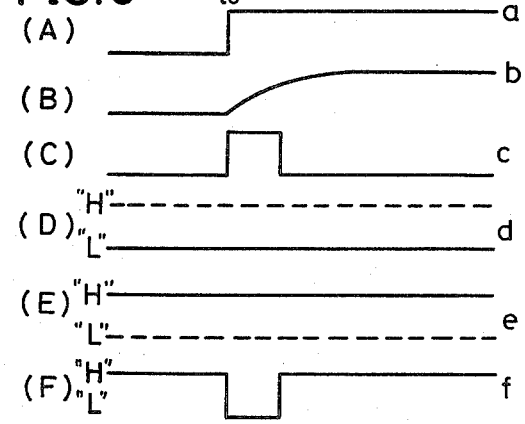

RECORDING MODE LOCKING SYSTEM IN A VIDEO SIGNAL MAGNETIC RECORDING APPARATUS

BACKGROUND OF THE INVENTION

The present invention relates generally to recording mode locking systems in video signal magnetic recording apparatuses, and more particularly to a recording mode locking system in a video signal magnetic recording and/or reproducing apparatus having a mechanism for pulling out a magnetic tape from within a cassette upon recording or reproduction modes to load the magnetic tape unto a predetermined tape path and performing an unloading operation in which the magnetic tape is accommodated within the cassette upon stopping mode, which does not unload the magnetic tape and restarts to continue performing a recording operation in a state where the magnetic tape is loaded unto the predetermined tape path when a power source switch is turned OFF during a recording mode and the power source switch is turned back ON afterwards.

Generally, a video signal magnetic recording and/or reproducing apparatus (hereinafter referred to as a VTR) which uses a cassette which accommodates a magnetic tape therein, is provided with a loading mechanism for pullsing out the magnetic tape from within the cassette upon recording or reproduction modes to load the magnetic tape unto a predetermined tape path and performing an unloading operation in which the magnetic tape is accommodated within the cassette upon stopping mode. A VTR provided with this type of a loading mechanism is constructed so that the loading mechanism performs an unloading operation when the VTR is put into a stopping mode upon completion or discontinuation of the recording or reproduction.

In a VTR of the above type, when the power source is turned OFF in the recording mode without changing the operation mode into a stopping mode, each mechanism within the VTR remain in the same states as those when the power source was turned OFF, and the magnetic tape is in the loaded state, however, when the power source is next turned ON, the operation mode of the VTR is generally always automatically put into the stopping mode so that the loading mechanism automatically performs an unloading operation. This function is provided so that no inconveniences are introduced regardless of which operation mode is selected after the power source switch is turned back ON, since the stopping mode in which the magnetic tape is accommodated within the cassette is the starting point (original point) from which various operation modes such as recording, reproduction, fast-forward, and rewind modes are initiated.

On the other hand, in a portable VTR which records a video signal produced from an image pickup output obtained by the use of an image pickup camera, an internal battery is used as the power source. Generally, the capacity of this type of a battery is not large, and thus, in order to reduce the power consumption, the power source is often turned OFF when the VTR is not operated. For example, a so-called continuous recording of different programs is often performed in which the power source is onced turned OFF due to the termination of recording of one program, change in the object which is to be image-picked up, or operator's will, after the image of a scene is recorded, and the power source is turned ON after a certain time interval has elapsed to restart and continue the recording.

Accordingly, in the conventional apparatus, the loading mechanism once automatically performs an unloading operation as described above when the power source is turned ON after the power source has been turned OFF. Therefore, when a recording button is next pushed and operated, the loading mechanism performs a loading operation in which the magnetic tape is loaded unto a predetermined tape path to start the recording operation. However, when the magnetic tape which is in a loading state is once unloaded and accommodated within the cassette, and then pulled out from within the cassette to load the magnetic tape, the former recording finishing end position on the magnetic tape with respect to the video head of the guide drum is not accurately returned back into the original position before the unloading operation was performed, and a slight deviation in the magnetic tape position is introduced. This slight deviation in the magnetic tape position is of course introduced when the feeding of the magnetic tape upon loading and the take-up of the magnetic tape upon unloading are respectively performed by use of different reels, however, the above slight deviation in the magnetic tape position is also introduced when the same reel is used upon the above described loading and unloading of the magnetic tape.

When deviation exists between the recording starting position and the previous recording finishing end position in the magnetic tape as described above, the recording starting position and the recording finishing end position in the magnetic tape sometimes overlap, or in some cases, a non-recorded part is formed in the magnetic tape between the recording finishing position and the recording starting position. In a case where these overlapping part or non-recorded part is reproduced, inconsistency in the picture, and noise bar are introduced in the reproduced picture. In addition, when recording is to be performed in a state where the above undesirable effects are not introduced, the power source must constantly be turned ON, and this resulted in unnecessary power consumption.

SUMMARY OF THE INVENTION

Accordingly, a general object of the present invention is to provide a novel and useful recording mode locking system in a video magnetic signal recording apparatus in which the above described problems have been overcome.

Another and more specific object of the present invention is to provide a recording mode locking system in a video signal magnetic reproducing apparatus, which enables continuous recording in which the operation mode of the apparatus is not put into a stopping mode when the power source is turned OFF and then turned ON and remains in the recording mode, by providing a recording mode locking switch and maintaining this switch closed. According to the system of the present invention, the unloading and loading of the magnetic tape are not performed since the operation mode is not put into the stopping mode when the power source is again turned ON, and thus, deviation in the position of the magnetic tape is not introduced to allow recording to start at a position in the magnetic tape immediately after the former recording end position. Therefore, a gap or overlapping of the signal are not introduced at the joint in the magnetic tape, and noise, inconsistency of the picture, and the like are accordingly not introduced in the reproduced picture at the joint in the magnetic tape. In addition, when the system of the present invention is applied to a portable magnetic recording and/or reproducing apparatus of a type provided with an internal battery, the power consumption of the apparatus can be reduced, since the power source can be turned OFF without introducing any inconveniences as described above.

Further objects and features of the present invention will be apparent from the following detailed description when read in conjunction with the accompanying drawings.

BRIEF DESCRIPTION OF THE DRAWINGS

FIG. 1 is a general plan view of an example of a common video signal magnetic recording and/or reproducing apparatus which can be applied with a recording mode locking system according to the present invention;

FIG. 2 is a systematic circuit diagram showing an embodiment of a recording mode locking system according to the present invention; and FIGS. 3(A) through 3(F) are diagrams respectively showing signal waveforms at each part of the circuit system shown in FIG. 2.

DETAILED DESCRIPTION

In FIG. 1, a magnetic tape 10 is wound around supply side and take-up side reel discs 12 and 13 accommodated within a cassette 11, as tape rolls 10a and 10b. In a state where the magnetic tape 10 is accommodated within the cassette 11, the magnetic tape is guided by guide pins 14 and 15 between the tape rolls 10a and 10b, and is at position indicated by a dotted line 10c.

When the cassette 11 is loaded into a predetermined position within a recording and/or reproducing apparatus (hereinafter referred to as a VTR) upon recording, a pair of guide poles 16a and 16b which are also used as tape drawing-out poles, and a capstan 17 are respectively and relatively inserted into the cassette 11 from the lower side thereof. Thus, when a record button is pushed after the power source is turned ON, the VTR enters into a recording mode. In this state, a motor 18 for loading and unloading rotates, and this rotation of the motor 18 is transmitted to a loading and unloading mechanism (not shown) through a transmitting mechanism (not shown). Accordingly, the guide poles 16a and 16b respectively move out side the cassette 11 in a state where the magnetic tape 10 is engaged with these guide poles 16a and 16b, and respectively reach positions indicated by solid lines 16A and 16B by moving along respective loci shown by one-dot chain lines. At this point, the guide poles 16a and 16b respectively move while pulling the magnetic tape from either one of the tape rolls 10a and 10b. In addition, these transmitting mechanism for transmitting the rotation, and the loading and unloading mechanism are widely realized as products, and hence, the illustration of the construction and description of these mechanisms will be omitted since the construction of these mechanisms are well known.

Accompanied by the above movement of the guide poles 16a and 16b, a tension pole 24 provided on a tension arm (not shown) is also displaced to a position shown in FIG. 1. As the capstan 17 rotated, a pinch roller 19 pushes against the capstan 17 through the magnetic tape 10, to drive and move the magnetic tape 10. Moreover, the take-up side reel disc 13 is rotated in the tape take-up direction.

Therefore, the magnetic tape 10 pulled out from the tape roll 10a is guided by the guide pin 14 and the tension pole 24, and after making contact with a full width erasing head 20, reaches a range restricted by the guide poles 16A and 16B, to make contact with a guide drum 21 in a relatively inclined manner. This guide drum 21 comprises an upper rotary drum having a pair of video heads and a fixed lower drum, for example. When the magnetic tape 10 moves along the guide drum 21, the magnetic tape 10 is recorded with a video signal by the video heads in oblique tracks with respect to the longitudinal direction of the magnetic tape. The magnetic tape 10 further makes contact with a erasing head 22 and an audio and control head 23, and is taken up by the tape roll 10b on the tape take-up side within the cassette 11. The above described tape path is the predetermined tape path upon loading state.

When the operation mode of the VTR is put into a stopping mode, the motor 18 rotates in the reverse direction, and the guide poles 16A and 16B respectively reach back to the positions indicated by the dotted lines 16a and 16b within the cassette 11. Furthermore, the part of the magnetic tape 10 which was outside the cassette 11 is taken up by the tape roll 10a or 10b, and all the parts of the magnetic tape 10 is accordingly accommodated within the cassette 11, to perform a tape unloading operation.

In a case where the operations to accommodate the magnetic tape 10 within the cassette 11 and pull out the magnetic tape 10 outside the cassette 11 upon tape unloading and tape loading operations are performed by either one of the tape rolls, that is, in a case where the tape roll which is to be used to perform the above operations is not specified, the finishing end position of the previous recording track upon unloading cannot be accurately returned to the identical position with respect to the guide drum 21 due to the elasticity of the magnetic tape and the like, when the tape loading operation is performed after the tape unloading operation is performed. However, the above problem is also introduced when the tape roll which winds up the magnetic tape into the cassette and pays out the magnetic tape outside the cassette, is specified. Accordingly, an overlapping portion or a gap is introduced between the previous recording finishing end and the next recording starting end on the magnetic tape, upon recording of a video signal after the VTR has been set to a different operation mode.

The present invention has eliminated the above described problems, and one embodiment of such will now be described in conjunction with FIG. 2.

First, description will be given with respect to a general application of the present embodiment of the invention which is the same as that in the case of the conventional system. Upon normal recording, a recording locking switch 36 is kept open. Thus, when a power source switch 30 is opened, power is supplied to a circuit system within the VTR through a terminal 39, and a signal is directly supplied to an operation mode signal processing circuit 38 comprising a microcomputer within a discriminating circuit 34. Hence, a stopping signal is obtained from an output terminal 41 of the signal processing circuit 38. This stopping signal thus obtained, is supplied to a stopping circuit through a terminal 43, and also applied to the base of a transistor Q3 within a motor driving circuit 44.

Accordingly, the transistor Q3 is turned ON, to turn a transistor Q4 ON. Thus, a current is supplied to motor 18 through these transistors Q3 and Q4, and the motor 18 rotates in the reverse direction. In a case where the magnetic tape 10 is in a loading state within the VTR, an unloading operation is performed. Hence, the operation mode is set to an initial operation state. Moreover, in a case where the magnetic tape 10 is accommodated within the cassette 11 upon opening of the power source switch 30, a switch 45 is in an open state, and the motor 18 does not rotate in the unloading direction, that is, the reverse direction.

A recording operation signal is supplied to a recording input terminal 38a of the operation mode signal processing circuit 38, when a record button is operated. Furthermore, a recording mode signal is obtained from an output terminal 40 of the signal processing circuit 38, and this recording mode signal thus obtained is supplied to a recording circuit through a terminal 42, and also applied to the base of a transistor Q1 within the motor driving circuit 44. Accordingly, the transistor Q1 is turned ON, to turn a transistor Q2 ON, and a current is supplied to the motor 18 through these transistors Q1 and Q2. Therefore, the motor 18 rotates in the positive direction, and a loading operation is performed by the guide poles 16a and 16b, to be followed by a recording operation. In addition, an input signal is applied to respective input terminals 38b through 38e of the operation mode signal processing circuit 38 upon respective operation modes, namely, the reproduction mode, fast-forward mode, rewinding mode, and stopping mode.

Description will now be given on the system according to the present invention for a case where the recording of one information signal is completed, and the power source is once turned OFF to reduce the power consumption until when the recording of another information signal is started.

In a case where the recording is to be continued after the power source is once turned OFF, the recording locking switch 36 is closed. The power source switch 30 is once opened after the tape moving system is stopped by pushing a pause button, when the recording of one video signal is completed in the above described state. The supply of power is disconnected by the opening of the power source switch 30, and the entire operation of the VTR is stopped in a state where the magnetic tape 10 is in the loaded state.

Then, the power source switch 30 is closed at a time $t_0$ upon recording of a following video signal. Accordingly, as shown in FIG. 3(A), a signal a which rises at the time $t_0$ is supplied to a wave forming circuit 32 comprising an exclusive-OR circuit 31, and also supplied to a delay circuit 33. Moreover, power is supplied to a circuit system within the VTR through the terminal 39. An output signal b of the delay circuit 33 shown in FIG. 3(B) is also supplied to the wave forming circuit 32, and an exclusive-or operation is performed within the wave forming circuit 32 between the signals a and b. An output signal c of the wave forming circuit 32 has a pulse width of two seconds, for example, and is supplied to one input terminal of a NAND-gate 35 within the discriminating circuit 34.

The recording locking switch 36 and an inverter 37 are connected in series between the other input terminal of the NAND-gate 35 and ground. The voltage potential at the recording locking switch 36 is of low level (ground potential) as shown by d in FIG. 3(D), since the recording locking switch 36 is closed. In addition, a signal e of high level shown in FIG. 3(E) is applied to the other input terminal of the NAND-gate 35 through the inverter 37. As a result, a signal f shown in FIG. 3(F) is obtained from the NAND-gate 35, and supplied to the operation mode signal processing circuit 38.

When the signal f is supplied to the signal processing circuit 38, the recording mode signal is produced through the output terminal 40. Hence, the recording circuit is supplied with the recording mode signal through the terminal 42, and the operation state of the recording circuit is put into a recording operation state. The motor driving circuit 44 is supplied with the recording mode signal, however, since the VTR is in a loading state, the switch 45 is open, and the motor 18 does not rotate in the loading direction, that is, the positive direction. Accordingly, the magnetic tape 11 remains loaded in the predetermined tape path.

Thus, when the power source switch 30 is closed again, the recording operation is immediately performed. At this time, since the unloading and loading operation of the magnetic tape 10 is not performed, the position of the magnetic tape does not vary, and a following video signal can accordingly be recorded immediately after the recording finishing end position in the magnetic tape of the recording performed before the power source switch 30 was opened. Hence, an overlap or a gap is not introduced between the recording finishing end position of the previous recording and the recording starting position of the present recording.

When a stopping button (now shown) is pushed upon completion of all the recording, a stopping operation signal is applied to the terminal 38e of the operation mode signal processing circuit 38. Accordingly, a stopping signal is produced from the output terminal 41 of the signal processing circuit 38, and this stopping signal is supplied to a circuit in a next stage through the terminal 43. Thus, the electric circuit system is put into a stopped state. In addition, the transistors Q3 and Q4 of the motor driving circuit 44 are turned ON, and the motor 18 is rotated in the reverse direction, to perform an unloading operation of the magnetic tape 10.

In order to continue recording after the power source switch 30 has been opened by closing the locking switch 36, the locking switch 36 can be closed at any time within the time interval (pulse width) of the signal c (f) (two seconds in the present embodiment of the invention) from the time the power source switch 30 is closed again.

Moreover, the reason for providing a time inverval (pulse width) of two seconds in the signals c and f, is to prevent the VTR from entering a recording mode for a predetermined time (two seconds) after the power source switch 30 is closed, when the operator erroneously closes the locking switch 36 during the reproduction mode of the VTR.

Further, this invention is not limited to these embodiments but various variations and modifications may be made without departing from the scope of the invention.

What is claimed is:

1. A recording mode locking system in a video signal magnetic recording apparatus having loading means operating between loaded and unloaded states, a magnetic tape which is loaded from a predetermined position into a predetermined tape path and which is unloaded from the loaded state, a power source swith which closes or opens for supplying or interrupting a source power to the apparatus, and means for enabling said loading means to perform an unloading operation when said power source switch is closed, said recording mode locking system comprising:

locking switch means which is activated for locking the recording mode; and recording mode signal producing means for producing a recording mode signal upon the closing of said power source switch where said locking switch means is in an activated state and said tape is in a loaded state, said loading means remaining in said loaded state responding to the recording mode signal.

2. A recording mode locking system as claimed in claim 1 which further comprises a signal forming circuit for forming an output signal having a predetermined waveform responsive to a closing of said power source switch, and AND or NAND means for performing an AND or NAND operation responsive to the output signal of said signal forming circuit and to the activated state of said locking switch, means for supplying an output of said AND or NAND means to said recording mode signal producing means, and means for producing said recording mode signal in response to a signal produced by said AND or NAND means according to the activated state of said locking switch and the closing of said power source switch.

3. A recording mode locking system as claimed in claim 2 in which said signal forming circuit forms an output signal having a predetermined sustaining time responsive to a closure of said power source switch, and said recording mode signal producing means produces a recording mode signal for said predetermined sustaining time responsive to the signal formed by said signal forming circuit.

4. A recording mode locking system as claimed in claim 3 in which said predetermined sustaining time is substantially two seconds.

* * * * *

UNITED STATES PATENT AND TRADEMARK OFFICE
CERTIFICATE OF CORRECTION

PATENT NO. : 4,408,235

DATED : October 4, 1983

INVENTOR(S) : Yukio Ito

It is certified that error appears in the above-identified patent and that said Letters Patent is hereby corrected as shown below:

Column 6, line 66, change "swith" to --switch--.

Signed and Sealed this

Twenty-first Day of February 1984

[SEAL]

Attest:

GERALD J. MOSSINGHOFF

Attesting Officer     Commissioner of Patents and Trademarks